US 12,092,016 B2

United States Patent
Leone et al.

(10) Patent No.: US 12,092,016 B2
(45) Date of Patent: Sep. 17, 2024

(54) METHODS AND SYSTEMS FOR PRECHAMBER

(71) Applicant: Ford Global Technologies, LLC, Dearborn, MI (US)

(72) Inventors: Thomas G. Leone, Ypsilanti, MI (US); Michael Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/809,530

(22) Filed: Jun. 28, 2022

(65) Prior Publication Data

US 2023/0417173 A1    Dec. 28, 2023

(51) Int. Cl.
*F02B 19/18* (2006.01)
*F02F 3/28* (2006.01)

(52) U.S. Cl.
CPC ............... *F02B 19/18* (2013.01); *F02F 3/28* (2013.01)

(58) Field of Classification Search
CPC .... F02D 41/00; F02B 19/18; F02B 2075/125; F02B 2275/40; F02F 3/28
See application file for complete search history.

(56) References Cited

U.S. PATENT DOCUMENTS

| | | | |
|---|---|---|---|
| 5,189,333 A | 2/1993 | Kagawa et al. | |
| 5,307,773 A | 5/1994 | Suzuki | |
| 5,392,744 A * | 2/1995 | Regueiro | F02B 19/18 123/262 |
| 5,417,189 A * | 5/1995 | Regueiro | F02B 23/0687 123/262 |
| 5,463,267 A | 10/1995 | Conway | |
| 7,353,797 B1 | 4/2008 | Breidenthal | |
| 7,412,966 B2 | 8/2008 | Lewis et al. | |
| 7,513,234 B1 | 4/2009 | Baldwin et al. | |
| 8,925,518 B1 | 1/2015 | Riley et al. | |
| 9,739,192 B2 * | 8/2017 | Willi | F02M 21/0248 |
| 9,890,690 B2 | 2/2018 | Chiera et al. | |
| 10,337,397 B2 | 7/2019 | Shelby et al. | |
| 10,364,738 B2 | 7/2019 | VanDerWege | |
| 11,066,980 B1 | 7/2021 | Leone et al. | |
| 11,156,149 B1 | 10/2021 | Leone et al. | |
| 11,215,109 B2 * | 1/2022 | Ono | F02B 19/04 |
| 11,293,337 B1 | 4/2022 | Czekala et al. | |
| 11,365,685 B2 | 6/2022 | Leone et al. | |
| 11,378,002 B1 | 7/2022 | Leone et al. | |

(Continued)

FOREIGN PATENT DOCUMENTS

| | | |
|---|---|---|
| DE | 102006037412 A1 | 2/2008 |
| DE | 102016005044 A1 | 11/2016 |

(Continued)

OTHER PUBLICATIONS

Leone, T. et al., "Systems and Methods for Adjustable Pre-Chamber," U.S. Appl. No. 17/643,143, filed Dec. 7, 2021, 92 pages.

*Primary Examiner* — Grant Moubry
(74) *Attorney, Agent, or Firm* — Vincent Mastrogiacomo; McCoy Russell LLP

(57) ABSTRACT

Methods and systems are provided for a pre-chamber. In one example, a system includes a pre-chamber and a piston arranged in a combustion chamber. The piston and/or combustion chamber comprise one or more features configured to force squish flow into the pre-chamber.

8 Claims, 6 Drawing Sheets

(56) References Cited

U.S. PATENT DOCUMENTS

| | | | |
|---|---|---|---|
| 11,512,624 B1* | 11/2022 | Leone | F02B 19/1047 |
| 2006/0219210 A1 | 10/2006 | Bailey et al. | |
| 2016/0363041 A1 | 12/2016 | Moffat et al. | |
| 2018/0294624 A1 | 10/2018 | Niessner et al. | |
| 2019/0353088 A1 | 11/2019 | Ketterer | |
| 2021/0207524 A1 | 7/2021 | Riley | |
| 2021/0246822 A1 | 8/2021 | Ono et al. | |
| 2021/0262408 A1* | 8/2021 | Glugla | F02D 41/3094 |

FOREIGN PATENT DOCUMENTS

| | | |
|---|---|---|
| DE | 102017222814 A1 | 6/2019 |
| DE | 102018220171 A1 | 5/2020 |
| GB | 2183727 A | 6/1987 |
| KR | 20030000002 A | 1/2003 |
| WO | 2016075358 A1 | 5/2016 |

* cited by examiner

METHODS AND SYSTEMS FOR PRECHAMBER

FIELD

The present description relates generally to methods and systems for a pre-chamber purged by squish flow.

BACKGROUND/SUMMARY

Engines have in the past utilized pre-chamber combustion to increase combustion efficiency and correspondingly reduce emissions. Pre-chamber combustion systems may include an auxiliary pre-chamber adjacent to the main combustion chamber with an ignition device and a fuel injector coupled to the auxiliary pre-chamber. In such systems, combustion may unfold in the following sequence; (i) a small amount of fuel is directly injected into the pre-chamber, (ii) spark is provided to the air/fuel mixture in the pre-chamber; and (iii) the hot gas jets into the main combustion chamber to ignite the charge disposed therein. Jetting the ignited gas into the main combustion chamber in this manner enables hot gas jets to penetrate deeper into the main combustion chamber, causing more evenly distributed ignition, when compared to engines that do not employ pre-chamber schemes.

However, the examples provided above describe embodiments of an active pre-chamber. While active pre-chambers may enhance efficiency at a wider range of operating conditions relative to passive pre-chambers, active pre-chambers may be more expensive and require a larger packaging space than passive pre-chambers.

Passive pre-chambers may include only the ignition device, such as a spark plug. Passive pre-chambers may enhance efficiency only during certain loads, such as high loads. In one example, an efficiency of the passive pre-chamber may be limited by its size, its ability to discharge residual gases, and how quickly jets expelled therefrom ignite a main combustion mixture outside the pre-chamber in the main combustion chamber. Thus, there is a demand for a passive pre-chamber which is efficient over a wider range of operating conditions.

In one example, the issues described above may be addressed by a system including an engine and at least one cylinder. A pre-chamber is arranged in the cylinder and comprises a plurality of orifices. A piston comprises a piston crown, the piston crown comprising a pocket configured to receive the pre-chamber within a threshold range of top-dead-center. In this way, the pocket may direct squish flow into the pre-chamber and expel residual gases therefrom.

As one example, squish is created by the piston as it approaches top-dead center (TDC). The shape of the pocket and the pre-chamber may enhance the squish flow to force residual gases out of an interior volume of the pre-chamber and into the main combustion chamber. By doing this, the efficiency of the pre-chamber may be increased across a wider range of operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
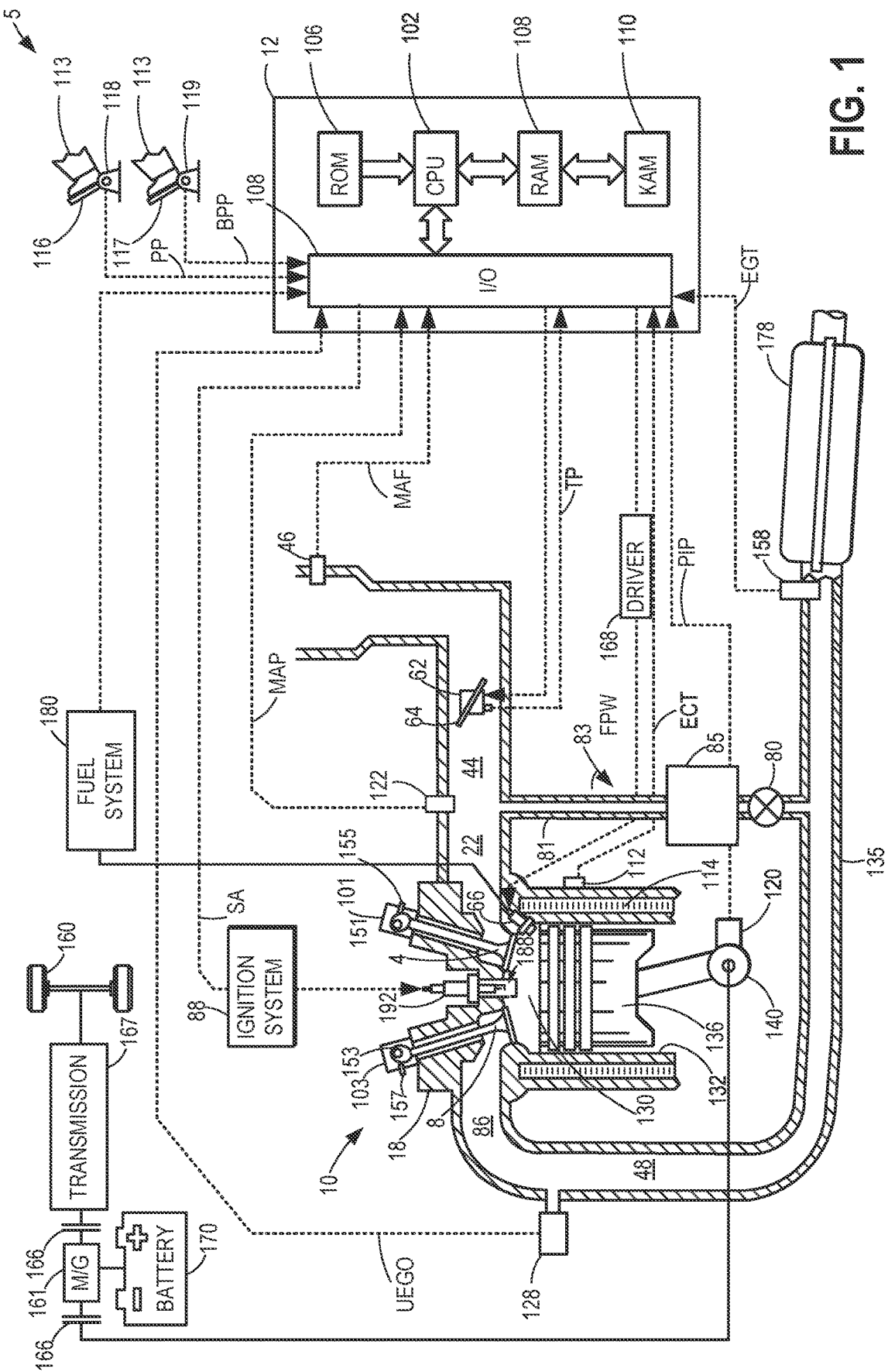
FIG. 1 illustrates a schematic of an engine included in a hybrid vehicle
Figure 2:
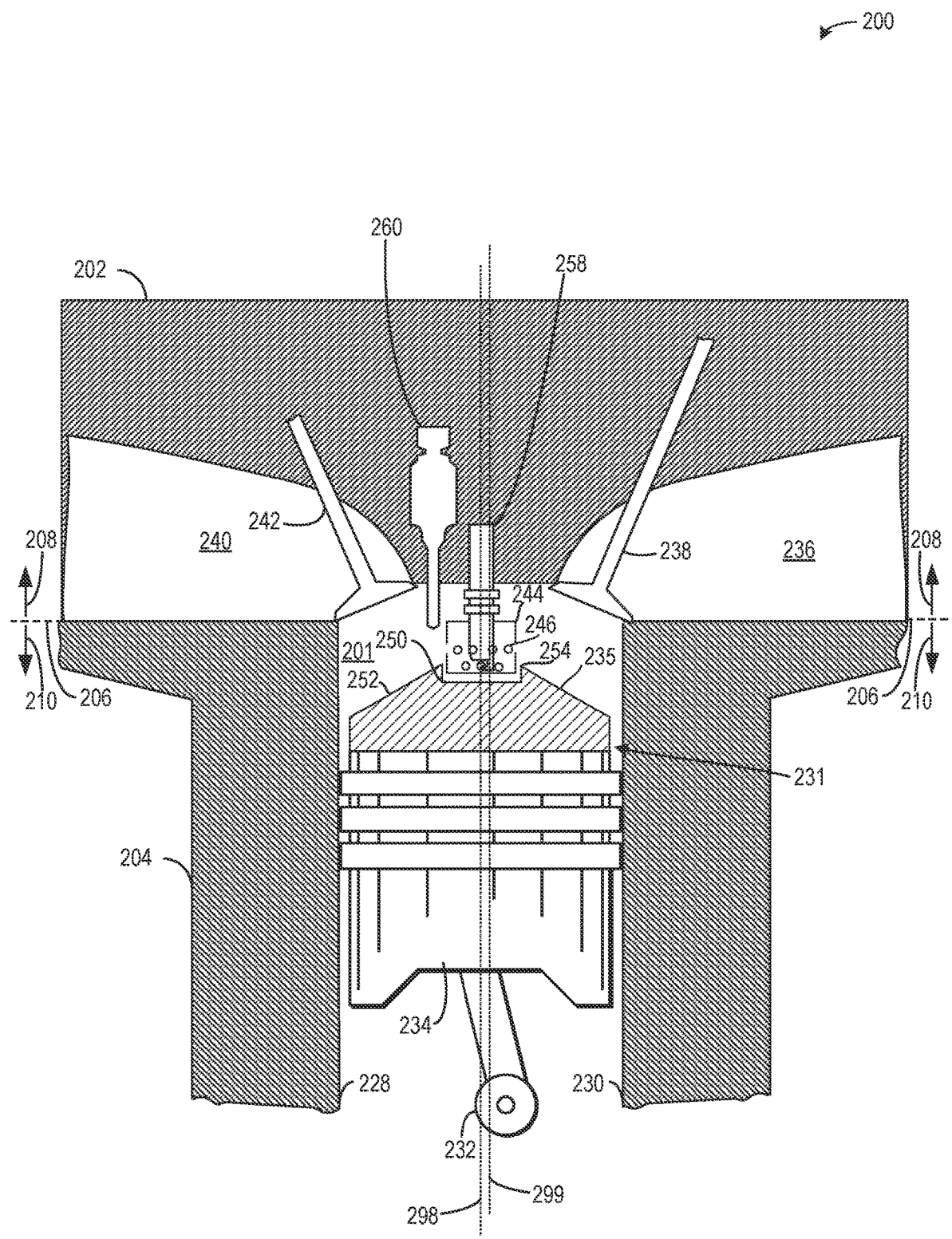
FIG. 2 illustrates an embodiment of a pre-chamber included in the engine.
Figure 3:
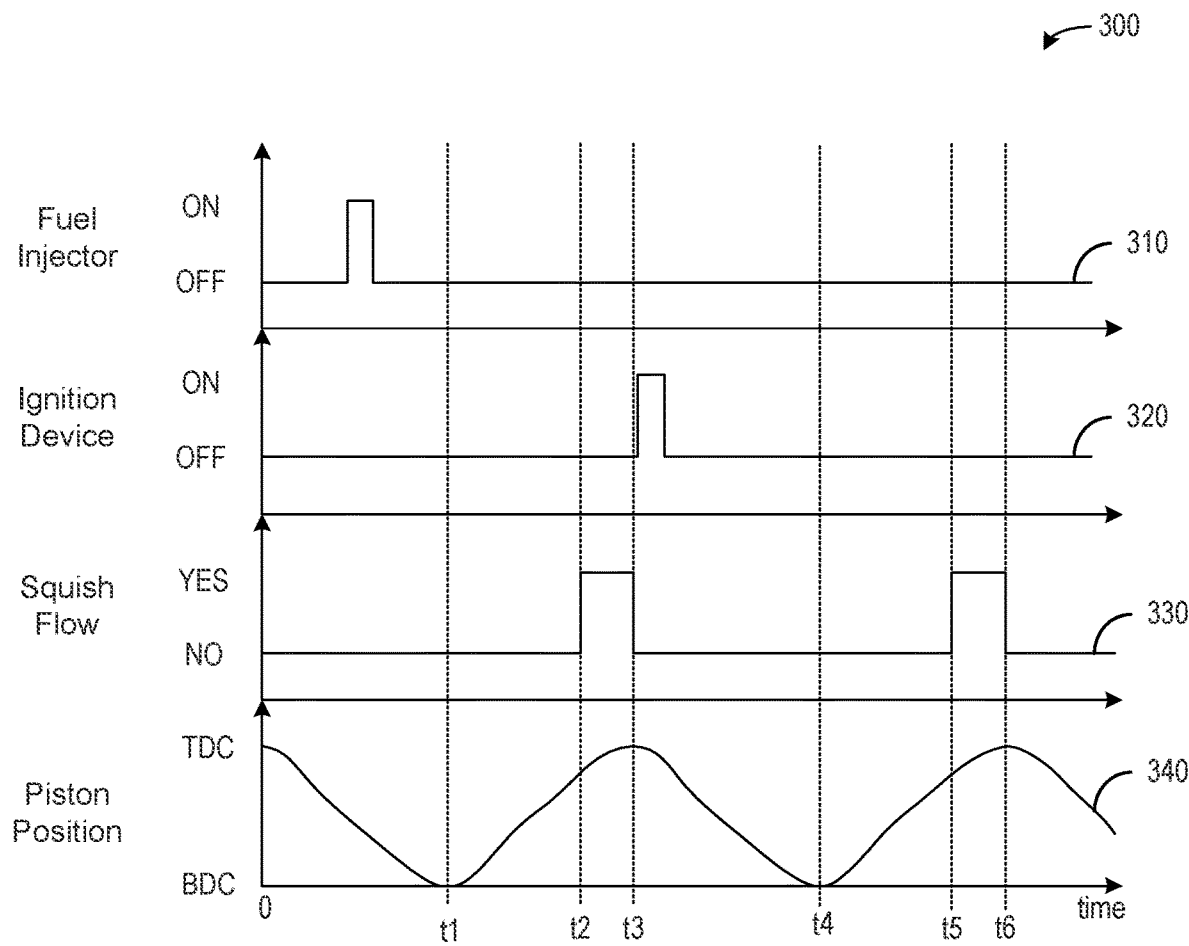
FIG. 3 illustrates an engine cycle.
Figure 4:
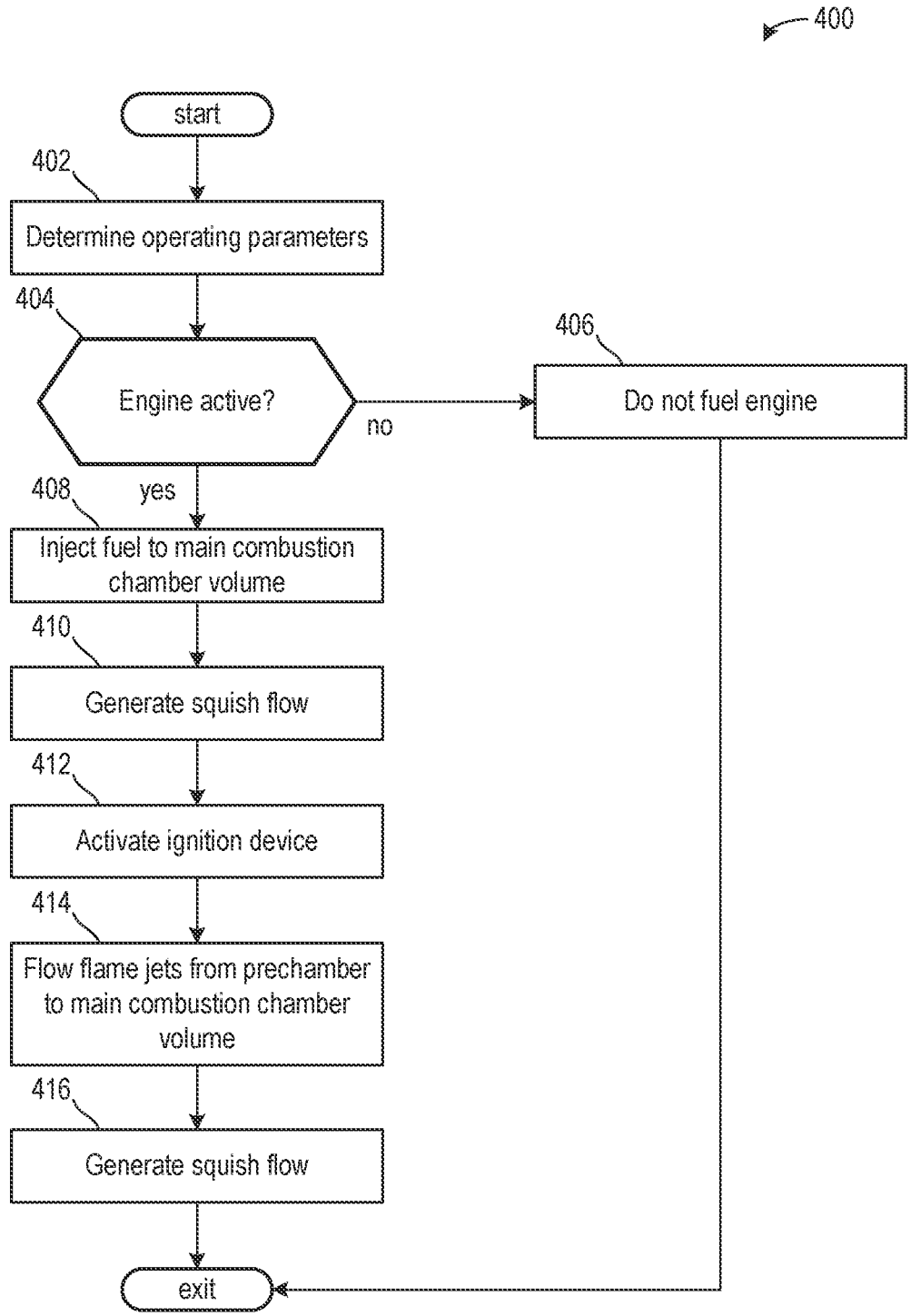
FIG. 4 illustrates a method for operating an engine.
Figure 6:
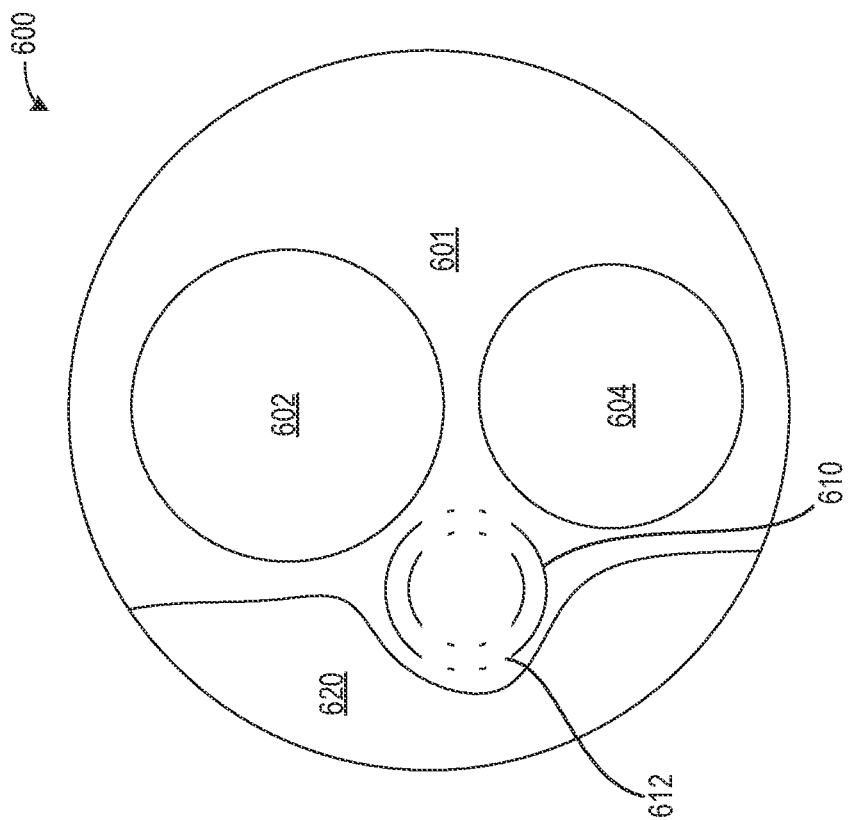
FIGS. 5 and 6 illustrate different embodiments of a squish feature of a cylinder.
Figure 5:
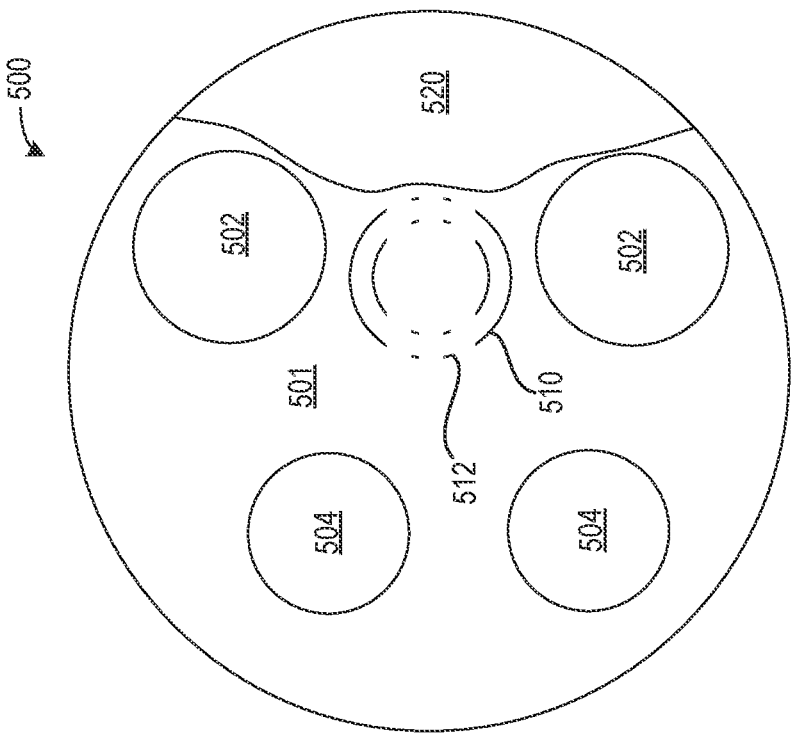
Figure 7:
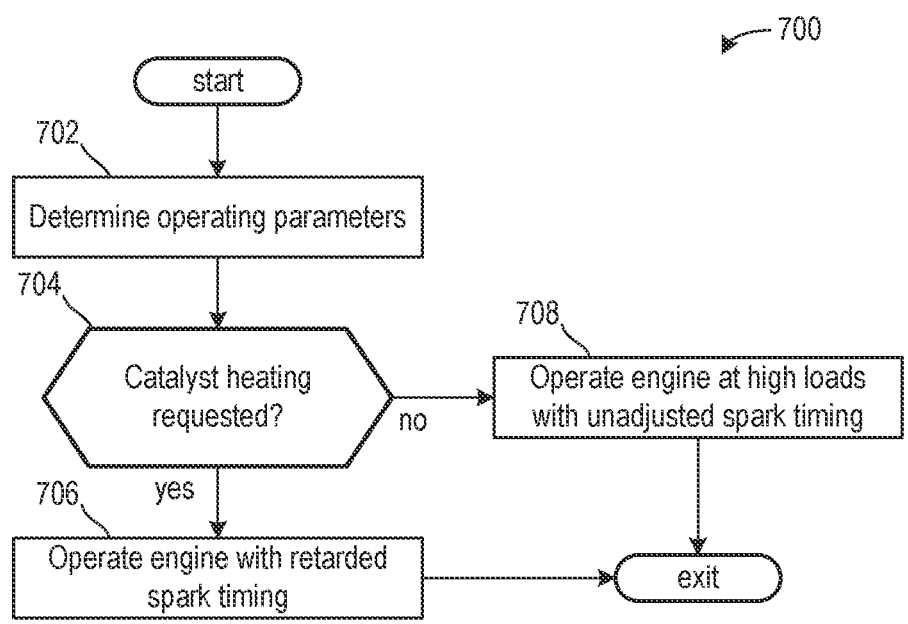
FIG. 7 illustrates a method for adjusting a spark timing based on a catalyst heating request.

The following description relates to systems and methods for a pre-chamber. The pre-chamber may be positioned in a combustion chamber of an engine. The combustion chamber may be shaped by a cylinder head, a cylinder block, and a piston, as illustrated in FIGS. 1 and 2. The piston may include a piston crown comprising a pocket configured to receive the pre-chamber. The pocket may force gases trapped between the piston and the pre-chamber through a plurality of pre-chamber openings and into an interior volume thereof. The gases may force residual gases out of the pre-chamber, which may mix with exhaust gases in the combustion chamber. The exhaust gases and residual gases may be expelled during the exhaust stroke, as shown in FIG. 3. A method for operating the engine is shown in FIG. 4. FIGS. 5 and 6 illustrate different embodiments of a squish feature of a cylinder. FIG. 7 illustrates a method for adjusting a spark timing based on a catalyst heating request.

In one example, embodiments included herein illustrate a system for generating squish flow in a combustion chamber comprising a passive pre-chamber. In one example, the pre-chamber includes an ignition device configured to provide a spark to an interior volume of the pre-chamber. The pre-chamber and/or the ignition device may be centrally located within the combustion chamber. The combustion chamber may include features configured to generate an asymmetric squish. Asymmetric squish may include generating a squish flow biased to an intake side of the combustion chamber. Additionally or alternatively, the pre-chamber and the ignition device may be arranged away from a center of the combustion chamber, biased toward a region in which the squish is generated. The pre-chamber may include a plurality of openings positioned to align with a direction of squish flow. For example, the plurality of openings may face an intake valve or toward a feature of a piston configured to force squish flow into the pre-chamber.

FIGS. 1-2 and 5-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein, and connected to a crankshaft 140. Cylinder 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

In the depicted view 5, intake valve 4 and exhaust valve 8 are located at an upper region of cylinder 130, and may be coupled to a cylinder head 18. Intake valve 4 and exhaust valve 8 may be controlled by a controller 12 using respective cam actuation systems including one or more cams what number in figure. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valve and exhaust valve may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO, a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount of EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically actuated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through an EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a preferred engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load, engine speed, engine temperature, etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In other examples, controller 12 may rely on a model that correlates a change in engine load with a change in a dilution requirement, and further correlates the change in the dilution requirement with a change in the amount of EGR requested. For example, as the engine load increases from a low load to a mid-load, the amount of EGR requested may increase, and then as the engine load increases from a mid-load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

Cylinder 130 can have a compression ratio, which is a ratio of volumes when piston 136 is at bottom-dead-center to top-dead-center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. The compression ratio may also be increased if pre-chamber ignition increases knock resistance due to faster combustion.

As a non-limiting example, cylinder 130 is shown including a fuel injector 66. Fuel injector 66 is shown coupled directly to cylinder 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. In another example, fuel injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from fuel injector 66 may vary with operating conditions. Furthermore, for a single combustion event, multiple injections of the delivered fuel may be performed per cycle. The multiple injections may be performed during a compression stroke, intake stroke, or any appropriate combination thereof.

In the example shown in FIG. 1, cylinder 130 includes a pre-chamber igniter 192 coupled to cylinder head 18 for initiating combustion. In some examples, the pre-chamber ignited 192 may be coupled to a mounting surface different than the cylinder head 18, such as a cylinder block or other portion of the cylinder. Pre-chamber igniter 192 includes a spark plug having a spark gap and further may include an adjustable pre-chamber cap and an internal cavity, referred to herein as a pre-chamber 188. Further, the walls of pre-chamber 188, which enclose the pre-chamber igniter 192, may include a plurality of openings. In one example, the pre-chamber igniter 192 is the only ignition device of the cylinder 130. As such, there are no other ignition devices in the engine 10 other than the pre-chamber igniter 192.

Each opening may provide a fluid coupling between pre-chamber 188 and cylinder 130, fluidically coupling an interior of pre-chamber 188 to an interior of cylinder 130. In one example, the pre-chamber 188 may include an actuator configured to adjust an opening size of the plurality of openings based on conditions of the engine 10. Thus, during some conditions, gases may flow between pre-chamber 188 and the interior of cylinder 130. For example, gases (e.g., air, fuel, and/or residual combustion gases) may flow through each opening with a directionality and rate based on a pressure difference across the opening (e.g., between pre-chamber 188 and the interior of cylinder 130).

An ignition system 88 may produce an ignition spark in pre-chamber igniter 192 in response to a spark advance signal SA from controller 12 under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event, or to provide a torque reserve. When pre-chamber igniter 192 sparks, the air-fuel mixture within the pre-chamber may combust, the increased pressure of combustion sending jets of flame into cylinder 130 via the plurality of orifice openings in the pre-chamber walls. The plurality of openings may be arranged such that the jets of flame are evenly distributed in cylinder 130. The jets of flame may ignite the air-fuel mixture in cylinder 130, causing combustion in cylinder 130. Additionally or alternatively, the size of the plurality of pre-chamber openings may be adjusted such that jets of flame occur reliably over a wider range of engine operating conditions. Additionally or alternatively, the size of the plurality of pre-chamber openings may be adjusted such that in some conditions, combustion inside the pre-chamber igniter 192 may propagate into the air-fuel mixture within cylinder 130 without creating jets of flame.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor unit 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 46, an engine coolant temperature signal (ECT) from an ECT sensor 112 coupled to coolant sleeve 114, signal UEGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an manifold absolute pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, pre-chamber igniter 192, the intake/exhaust valves and cams, etc. The controller may receive input data from the various sensors, process the input data, and trigger the actuators in response to the processed input data based on instructions or code programmed therein corresponding to one or more routines, an example of which is described with respect to FIG. 4.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), igniter, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Turning now to FIG. 2, it shows an example of a single cylinder of an engine 200. In one example, the engine 200 may be a non-limiting example of the engine 10 of FIG. 1. As such, the engine 200 may be included within the embodiment of a hybrid vehicle, such as vehicle 5 of FIG. 1.

The engine 200 comprises a primary combustion chamber 201 (herein, interchangeably referred to as a main combustion chamber). The primary combustion chamber 201 may be a non-limiting example of the combustion chamber 30 of FIG. 1. The primary combustion chamber 201 may be defined via a cylinder head 202, a first interior cylinder wall 228, a second interior cylinder wall 230, and a piston top surface 231. It will be appreciated that the first interior cylinder wall 228 and the second interior cylinder wall 230 may be a single, continuous wall. However, in the example of FIG. 2, the cross-section divides the walls into two pieces. In this way, a primary combustion chamber volume may be defined by a cylinder head 202, the first interior cylinder wall 228, the second interior cylinder wall 230, and the piston top surface 231. The primary combustion chamber volume may be adjusted via oscillation of the piston 234 about a first axis, such as cylinder central axis 299.

Arrow 208 illustrates a head side of the primary combustion chamber 201. Arrow 210 illustrates a block side of the primary combustion chamber 201. Dashed line 206 illustrates a border between the head side and the block side. In one example, the head side defining an upper limit within the combustion chamber 201 may be referred to as a fire deck. The fire deck may correspond to a portion of the cylinder head 202 closest to the piston 234 relative to other portions of the cylinder head 202.

The piston top surface 231 corresponds to an upper surface of the piston 234, wherein the piston 234 may be configured to oscillate within the primary combustion chamber 201 via a crankshaft 232. The crankshaft may rotate as a fuel air mixture within the primary combustion chamber 201 combusts and presses against the piston surface 231 and pushes the piston 234 downward. This action may result in motion of the vehicle.

The piston top surface 231 may be coupled to a piston crown 235. The piston crown 235 may include a pocket 250 and an angled surface 252. The angled surface 252 may include a conical shape, wherein the pocket 250 is arranged at an apex of the angled surface 252. The pocket 250 may be a depression, a recession, an opening, or other indentation positioned in the angled surface 252. As such, a tallest point of the angled surface may correspond to a rim 254, wherein the rim 254 may surround the pocket 250.

The pocket 250 may include a rectangular cross-sectional shape. In some embodiments, the pocket 250 may include a square cross-sectional shape. The pocket 250 may include a cylindrical shape configured to receive a pre-chamber 244.

To enhance combustion properties, such as combustion distribution, the pre-chamber 244 is fluidly coupled to the primary combustion chamber 201 via a plurality of openings 246. The pre-chamber 244 comprises only an ignition device 258. As shown, a fuel injector 260 positioned to inject into the primary combustion chamber 201 is positioned outside of the pre-chamber 244 and does not inject directly to a volume of the pre-chamber 244. In one example, the pre-chamber 244 is a passive pre-chamber. In one example, the ignition device 258 is a spark plug and the fuel injector 260 is configured to inject gasoline. Additionally or alternatively, the ignition device 258 may be a glow plug and the fuel injector 260 may be configured to inject diesel. In some examples, additionally or alternatively, the fuel injector 260 may be configured to inject a mixture of fuels including different amounts of carbon. In one embodiment, each of the fuel injector 260, the ignition device 258, and the prechamber 244 extend through and/or are coupled to the fire deck.

The primary combustion chamber 201 may receive air flow from an air intake passage 236 when an intake valve 238 is in an open position. The pre-chamber 244 may receive air from the primary combustion chamber 201 via one or more of the plurality of openings 246 and squish flow generated via the piston 234. The primary combustion chamber 201 may be fluidly coupled to an exhaust passage 240 when an exhaust valve 242 is in an open position. In one example, the primary combustion chamber 201 comprises only two valves, including the intake valve 238 and the exhaust valve 242. Exhaust gases along with other combustion artifacts (e.g., air, unburned fuel, etc.) may be expelled to the exhaust passage 240 from the primary combustion chamber 201. When the intake valve 238 and the exhaust valve 242 are in closed positions, such as the positions illustrated, the primary combustion chamber 201, and the pre-chamber 244 may be fluidly sealed from the intake passage 236 and the exhaust passage 240.

In this way, the primary combustion chamber 201 is a separate volume of space relative to the pre-chamber 244, wherein a volume of the primary combustion chamber 201 is greater than a volume of the pre-chamber 244. The pre-chamber 244 may receive intake gases and fuel vapor from the primary combustion chamber 201 and release an at least partially ignited fuel/air mixture to the primary combustion chamber 201 to initiate combustion within the primary combustion chamber 201 via the plurality of openings 246 and activation of the ignition device 258.

The piston 234 is illustrated in a position approaching TDC. As the piston 234 approaches TDC, the pocket 250 may receive the pre-chamber 244. Gases between the pocket 250 and the pre-chamber 244 may be forced into the interior volume of the pre-chamber 244. This may be referred to as squish flow. The squish flow may assist in expelling residual gases in the pre-chamber 244, which may enhance an efficiency of the pre-chamber 244 during a subsequent combustion. In one example, the piston 234 approaches TDC, and the pocket 250 forces squish flow of air and fuel through the plurality of openings 246 and into the pre-chamber 244. As the piston 234 leaves TDC and moves toward bottom-dead-center (BDC) during an expansion stroke, the ignition device 258 may be activated and flame jets may be expelled from the pre-chamber 244 to ignite the air/fuel mixture in the primary combustion chamber 201. As such, the timing of the ignition device 258 in combination with the features of the pre-chamber 244 and the piston 234 may be retarded relative to other spark timings in different engine configurations.

In one example, the pocket 250 may be shaped such that it surrounds a lower portion of the pre-chamber 244 corresponding to the plurality of openings 246 without touching the pre-chamber 244. The rim 254 may be configured such that at TDC, the rim 254 obstructs an upper portion and a lower portion of the plurality of openings 246. In one example, the upper portion of the plurality of openings 246 are closer to the cylinder head 202 than the lower portion of the plurality of openings 246. Additionally or alternatively, the rim 254 may obstruct only the lower portion of the plurality of openings 246. In some embodiments, additionally or alternatively, the rim 254 may only partially obstruct the upper portion of the plurality of openings 246.

In one example, a second axis, such as a pre-chamber central axis 298 may be misaligned with the cylinder central axis 299. The pre-chamber central axis 298 may correspond to a central axis of each of the ignition device 258 and the pocket 250.

In some examples, squish may be generated along one side of the primary combustion chamber 201, with or without a pocket 250. For example, squish may be generated closer to the intake side of the primary combustion chamber 201 via features of the piston or via features of cylinder walls, such as an angled cylinder head wall, a protrusion, or other feature that may promote squish flow. In such an example, squish flow may be generated in cylinder with two or more valves.

Turning now to FIG. 3, it shows a time plot 300 of an engine cycle. Plot 310 illustrates a fuel injector activity, plot 320 illustrates an ignition device activity, plot 330 illustrates if squish flow is occurring, and plot 340 illustrates a piston position. Time increases from a left to a right side of the figure.

Prior to t1, the piston moves (plot 340) from TDC to BDC during an intake stroke. During a portion of the intake stroke, the fuel injector is activated (plot 310) and injects fuel. In one example, the fuel injection during the intake stroke may be the only fuel injection. Additionally or alternatively, a secondary injection may occur during a compression stroke or after. The fuel injector may inject fuel directly to a main combustion chamber volume and not directly into the volume of the pre-chamber.

At t1, the piston position is BDC, indicating a transition from the intake stroke to the compression stroke. Between t1 and t2, the piston travels to TDC. At t2, squish flow (plot 330) begins to occur as the piston approaches TDC and the pre-chamber. The pocket of the piston may push the air/fuel mixture of the main combustion chamber into the volume of the pre-chamber. Between t2 and t3, squish flow continues and residual gases in the pre-chamber are replaced with the air/fuel mixture from the main combustion chamber.

At t3, the piston position is TDC and squish flow is complete. Between t3 and t4, an expansion stroke occurs and the piston moves from TDC to BDC. Slightly after TDC, the ignition device is activated (plot 320). As such, a pre-combustion flame may be initiated within the pre-chamber. The flame may be jetted from openings of the pre-chamber and ignited the air/fuel mixture in the main combustion chamber. By delaying the ignition device to after TDC, the residual gases in the pre-chamber may be expelled by the squish flow, resulting in increased combustion efficiency.

In some examples, additionally or alternatively, the ignition timing may be advanced to prior to TDC of the compression stroke during some operating conditions.

At t4, the piston position is BDC. Between t4 and t5, the exhaust stroke occurs and the piston moves from BDC toward TDC.

At t5, squish flow occurs for a second time during the engine cycle. The squish flow during the exhaust stroke, between t5 and t6, may force exhaust gases into the pre-chamber. The exhaust gases may cause turbulence within the volume of the pre-chamber, which may reduce an amount of residual gases in the volume of the pre-chamber during a subsequent engine cycle. This may enhance engine efficiency and power output.

At t6, the piston reaches TDC and the exhaust stroke is complete. Squish flow no longer occurs. After t6, the piston moves from TDC toward BDC as the subsequent engine cycle begins.

Turning now to FIG. 4, it shows a method 400 for flowing squish flow to the pre-chamber. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, the method 400 may include determining, estimating, and/or measuring current operating parameters. Current operating parameters may include, but are not limited to, one or more of a throttle position, an engine speed, an engine temperature, an engine load, a vehicle speed, and an air/fuel ratio.

At 404, the method 400 may include determining if the engine is active. The engine may be inactive during all-electric driving modes, coasting events, start/stop, or the like. All-electric driving modes may be selected in response to a driver demand corresponding to a load less than or equal to a threshold load. In one example, the threshold load is a low-load. At the low-load, the pre-chamber may be less efficient due to a timing of the ignition device configured for the positioning of the pre-chamber (e.g., off-center relative to a central axis of the combustion chamber about which the piston oscillates). If the engine is inactive, then at 406, the method may include not injecting fuel to the engine. Additionally, the ignition device of the pre-chamber may not be activated.

If the engine is active, then at 408, the method 400 may include injecting fuel directly to a combustion chamber volume. A desired amount of fuel may be injected during a single injection or across multiple injections spanning the intake and compression strokes. The amount of fuel in each of the multiple injections may be equal or different.

At 410, the method 400 may include generating a squish flow. The squish flow may be generated as the piston approaches TDC. The first instance of squish flow during the engine cycle may force air and/or an air/fuel mixture into the volume of the pre-chamber as the piston approaches TDC.

At 412, the method 400 may include activating the ignition device. The ignition device may provide a spark to an interior volume of the pre-chamber. In one example, a timing of the ignition device may include providing the spark after TDC of the compression stroke, such as at a start of the power stroke. In this way, the timing may be relatively late compared to other examples of ignition timing. By doing this, the pre-chamber may receive a higher amount of air and/or the air/fuel mixture prior to spark being initiated. In one example, additionally or alternatively, the spark timing after TDC of the compression stroke may be selected only when catalyst heating is desired during lower engine loads. If the engine is combusting during a high load, then an unadjusted (e.g., normal spark timing) may be desired. Normal spark timing may include a spark timing at or within a threshold crankangle (e.g., 15 degrees or less) before TDC of the compression stroke. Method 700 further describes adjusting the spark timing based on operation of engine in response to conditions.

At 414, the method 400 may include flowing the flame jets from the pre-chamber to the combustion chamber volume. As such, the ignited mixture of the pre-chamber may ignite the air/fuel mixture in the main combustion chamber volume.

At 416, the method 400 may include generating squish flow during an exhaust stroke and expelling exhaust gases from the volume of the pre-chamber.

Turning now to FIG. 5, it shows an embodiment 500 of a combustion chamber 501 including a plurality of valves. The plurality of valves may include intake valves 502 and exhaust valves 504 similar to intake valve 238 and exhaust valve 242 of FIG. 2, respectively. A pre-chamber 510 is arranged between the intake valves 502 and includes a plurality of openings 512 configured to admit air into the pre-chamber along a single axis.

The combustion chamber 501 may include a feature 520 configured to generate squish flow. The feature 520 may be arranged on only an intake side of the combustion chamber. The intake side may correspond to a portion of the combustion chamber 501 closest to the intake valves 502 and furthest from the exhaust valves 504. The feature 520 may be contoured to match a profile of the intake valves 502 and the pre-chamber 510. For example, the feature 520 may include a protrusion extending toward the pre-chamber 510 and between the intake valves 502. Said another way, the feature 520 may be customized to match a profile of the intake valves 502 and pre-chamber 510 such that a distance between a perimeter of the intake valves 502 and the pre-chamber 510 and perimeter of the feature 520 is minimized.

In one example, the feature 520 may generate a squish flow in a direction toward an exhaust side of the combustion chamber. As such, gases may be forced toward the pre-chamber 510 as a piston approaches TDC.

The plurality of openings 512 may be shaped such that squish flow generated by the feature 520 flows directly therethrough and into the volume of the pre-chamber 510. The pre-chamber 510 may include other openings arranged in other direction than the plurality of openings 512, in some embodiments.

In some examples, the feature 520 may be shaped such that it is closer to the piston than a cylinder head and other portions of a fire deck of the combustion chamber 501. Additionally or alternatively, the feature 520 may be sloped. The feature 520 may be smooth in one embodiment. Additionally or alternatively, the feature 520 may include grooves, protrusions, striations, and/or other elements that deviate from a smooth surface.

Turning now to FIG. 6, it shows an embodiment 600 of a combustion chamber 601. The combustion chamber 601 may include an intake valve 602 and an exhaust valve 604 similar to the intake valve 238 and the exhaust valve 242 of FIG. 2, respectively. A pre-chamber 610 is arranged between the intake valve 602 and the exhaust valve 604. The prechamber 610 includes a plurality of openings 612 configured to admit air into the pre-chamber along a single axis.

The combustion chamber 601 may include a feature 620 configured to generate squish flow. The feature 620 may be arranged on only one side of the combustion chamber 601. For example, the feature 620 may extend from an outer diameter of the combustion chamber 601 toward the intake valve 602, the exhaust valve 604, and the pre-chamber 610.

The feature 620 may be contoured to match a profile of the intake valve 602, the exhaust valve 604, and the pre-chamber 610. For example, the feature 520 may include a recess corresponding to a location of the pre-chamber 610 to accommodate the pre-chamber 610 while decreasing a gap therebetween. Said another way, the feature 620 may be customized to match a profile of the valves and the pre-chamber 610 such that a distance between a perimeter of the valves and the pre-chamber 610 and perimeter of the feature 620 is minimized.

In one example, the feature 620 may generate a squish flow in a direction toward an opposite portion of the combustion chamber 601. That is to say, the pre-chamber 610 and the feature 620 may be arranged on a first half of the combustion chamber 601, wherein the feature 620 is configured to generate a squish flow in a direction toward a second half of the combustion chamber 601. As such, gases may be forced toward the pre-chamber 610 as a piston approaches TDC.

The plurality of openings 612 may be shaped such that squish flow generated by the feature 620 flows directly therethrough and into the volume of the pre-chamber 610. The pre-chamber 610 may include other openings arranged in other direction than the plurality of openings 612, in some embodiments.

In some examples, the feature 620 may be shaped such that it is closer to the piston than a cylinder head and other portions of a fire deck of the combustion chamber 601. Additionally or alternatively, the feature 620 may be sloped. The feature 620 may be smooth in one embodiment. Additionally or alternatively, the feature 620 may include grooves, protrusions, striations, and/or other elements that deviate from a smooth surface.

Turning now to FIG. 7, it shows a method 700 for adjusting spark timing based on conditions in which the engine is being operated. The method 700 begins at 702, which includes determining operating parameters, similar to 402 of FIG. 4.

At 704, the method 700 may include determining if catalyst heating is requested. Catalyst heating may be requested in response to a catalyst temperature being less than a light-off temperature. The light-off temperature may be based on a reactivity of the catalyst. In one example, the light-off temperature may be based on a lower temperature at which the catalyst converts combustion products at a desired rate.

If catalyst heating is requested, then at 706, the method 700 may include operating the engine with retarded spark timing. The spark timing may be retarded relative to the unadjusted spark timing (e.g., normal spark timing) that occurs at or slightly before TDC. As such, the retarded spark timing may occur after TDC to allow a desired amount of squish flow into the pre-chamber and efficiency combustion. In one example, catalyst heating may be requested only during lower loads, which may occur during a cold-start.

If catalyst heating is not requested, then at 708, the method 700 may include operating the engine only at high loads with the normal spark timing. The squish flow at high loads may not provide the same combustion benefits when compared to lower loads. As such, the spark timing may be set to the normal spark timing.

The technical effect of configuring the piston and/or shaping the combustion chamber to promote squish flow into the pre-chamber is to purge residual gases at a greater range of operating conditions. By doing this, combustion efficiency may be increased and engine combustion may be utilized at a greater range of operating conditions.

The disclosure provides support for a system including an engine comprising at least one cylinder, a pre-chamber, arranged in the cylinder, comprising a plurality of orifices, and a piston comprising a piston crown, the piston crown comprising a pocket configured to receive the pre-chamber with a threshold range of top-dead-center. A first example of the system further includes where the pre-chamber and the pocket are aligned along a single central axis. A second example of the system, optionally including the first example, further includes where the pre-chamber comprises a plurality of lower openings. A third example of the system, optionally including one or more of the previous examples, further includes where the plurality of lower openings comprises a first plurality of lower openings and a second plurality of lower openings, the second plurality of lower openings is closer to the piston than the first plurality of lower openings. A fourth example of the system, optionally including one or more of the previous examples, further includes where the pocket obfuscates at least the second plurality of lower openings. A fifth example of the system, optionally including one or more of the previous examples, further includes where the piston comprises a rim and an angled surface extending around an entirety of the rim toward walls of the cylinder. A sixth example of the system, optionally including one or more of the previous examples, further includes where the pre-chamber comprises a cylindrical shape with a first diameter, and wherein the pocket comprises a corresponding cylindrical shape with a second diameter, the second diameter larger than the first, the corresponding cylinder shape of the pocket mating with the cylindrical shape of the pre-chamber.

The disclosure further provides support for a method including operating in an all-electric mode outside of a cold-start and during loads less than a threshold load, activating an engine during the cold-start and loads greater than or equal to the threshold load, and, forcing squish flow through a pre-chamber when the engine is active via a pocket of a piston. A first example of the method further includes where forcing squish flow comprises forcing gases arranged between the pocket and the pre-chamber through a plurality of openings of the pre-chamber to an interior volume of the pre-chamber as the piston approaches top-dead center. A second example of the method, optionally including the first example, further includes evacuating the pre-chamber when the engine is active as the piston moves out of a threshold range of top-dead center. A third example of the method, optionally including one or more of the previous examples, further includes where the squish flow is generated near a central portion of combustion chamber in which the pre-chamber and the piston are arranged. A fourth example of the method, optionally including one or more of the previous examples, further includes where a piston crown of the piston is asymmetric. A fifth example of the method, optionally including one or more of the previous examples, further includes where the pre-chamber and the pocket are aligned along a first axis, the first axis misaligned with a second axis about which the piston oscillates. A sixth example of the method, optionally including one or more of the previous examples, further includes where the prechamber is located between an intake valve and an exhaust valve in a cylinder head. A seventh example of the method, optionally including one or more of the previous examples, further includes where the pre-chamber is a passive pre-chamber.

The disclosure further provides support for a system including an engine comprising at least one cylinder having one or more squish features, a piston arranged in the at least one cylinder and configured to oscillate about a cylinder central axis, and a pre-chamber comprising a pre-chamber central axis is misaligned with the cylinder central axis, the pre-chamber comprising a plurality of openings aligned with a direction of squish flow generated by the one or more squish features. A first example of the system further includes where the one or more squish features are asymmetric and tailored to reduce a space between the pre-chamber and the one or more squish features. A second example of the system, optionally including the first example, further includes where the one or more squish features are arranged on a side of the at least one cylinder nearest to the pre-chamber. A third example of the system, optionally including one or more of the previous examples, further includes where the one or more squish features and the pre-chamber are biased toward an intake side of the at least one cylinder. A fourth example of the system, optionally including one or more of the previous examples, further includes where the one or more squish features are closer to the piston than other portions of a fire deck of the at least one cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
operating in an all-electric mode outside of a cold-start and during loads less than a threshold load of an engine;
activating the engine during the cold-start and loads greater than or equal to the threshold load; and
forcing squish flow through a pre-chamber when the engine is active via a pocket of a piston.

2. The method of claim 1, wherein forcing squish flow comprises forcing gases arranged between the pocket and the pre-chamber through a plurality of openings of the pre-chamber to an interior volume of the pre-chamber as the piston approaches top-dead center.

3. The method of claim 1, further comprising evacuating the pre-chamber when the engine is active as the piston moves out of a threshold range of top-dead center.

4. The method of claim 1, wherein the squish flow is generated near a central portion of combustion chamber in which the pre-chamber and the piston are arranged.

5. The method of claim 1, wherein a piston crown of the piston is asymmetric.

6. The method of claim 1, wherein the pre-chamber and the pocket are aligned along a first axis, the first axis misaligned with a second axis about which the piston oscillates.

7. The method of claim 1, wherein the pre-chamber is located between an intake valve and an exhaust valve in a cylinder head.

8. The method of claim 1, wherein the pre-chamber is a passive pre-chamber.

* * * * *